United States Patent
Harvey et al.

(10) Patent No.: US 9,214,802 B2
(45) Date of Patent: Dec. 15, 2015

(54) FAULT PROTECTION OF A VARIABLE DIFFERENTIAL TRANSFORMER (VDT) EXCITATION CIRCUIT

(71) Applicant: Hamilton Sundstrand Corporation, Charlotte, NC (US)

(72) Inventors: Nicholas C. Harvey, Windsor, CT (US); Christopher J. Jonke, Unionville, CT (US); Steven A. Avritch, Bristol, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 98 days.

(21) Appl. No.: 14/227,004

(22) Filed: Mar. 27, 2014

(65) Prior Publication Data

US 2015/0280422 A1    Oct. 1, 2015

(51) Int. Cl.
*H02H 3/20* (2006.01)
*H02H 9/04* (2006.01)
*H02H 3/08* (2006.01)
*H02H 9/02* (2006.01)
*H02H 7/04* (2006.01)

(52) U.S. Cl.
CPC .. *H02H 7/04* (2013.01); *H02H 3/08* (2013.01)

(58) Field of Classification Search
CPC .................................. H02H 3/08; H02H 7/04
USPC .......................................... 361/87, 91.1, 93.2
See application file for complete search history.

(56) References Cited

U.S. PATENT DOCUMENTS

| | | | | |
|---|---|---|---|---|
| 4,819,122 A * | 4/1989 | Gontowski, Jr. | ...... | H02H 7/1227 361/18 |
| 6,680,837 B1 * | 1/2004 | Buxton | ................. | H02H 3/087 327/309 |
| 7,439,718 B2 * | 10/2008 | Rozen | .................. | G06F 1/3203 323/274 |
| 7,817,393 B2 * | 10/2010 | Forghani-zadeh | | H03K 17/04206 361/93.1 |
| 8,040,652 B2 * | 10/2011 | Forghani-Zadeh | .... | H02H 9/025 361/93.1 |
| 2006/0232283 A1 * | 10/2006 | Nishimura | ........... | G01R 31/024 324/718 |
| 2013/0148247 A1 * | 6/2013 | Zhou | ....................... | H02H 9/04 361/91.5 |

* cited by examiner

*Primary Examiner* — Stephen W Jackson
*Assistant Examiner* — Christopher Clark
(74) *Attorney, Agent, or Firm* — Kinney & Lange, P.A.

(57) ABSTRACT

An excitation circuit includes an operational amplifier, a transistor circuit, a switch, and a pull-down resistor. The operational amplifier receives an excitation input voltage at a non-inverting input and provides an operational amplifier output. The transistor circuit receives the operational amplifier output and provides a transistor circuit output. The transistor circuit output is connected to an inverting input of the operational amplifier. The switch is connected between the operational amplifier output and the transistor circuit. The switch is opened to disconnect the operational amplifier output from the transistor circuit. The pull-down resistor is connected between an output of the switch and ground, wherein the pull-down resistor turns off the transistor circuit when the switch is opened.

13 Claims, 2 Drawing Sheets

FAULT PROTECTION OF A VARIABLE DIFFERENTIAL TRANSFORMER (VDT) EXCITATION CIRCUIT

BACKGROUND

The present invention relates generally to excitation circuits, and in particular to a system and method of controlling an excitation circuit during fault conditions.

Aircraft systems often utilize variable differential transformers (VDT's) to measure a linear or rotary position of mechanical equipment such as, for example, the position of a rudder, aileron, valve, or pilot control inceptor. VDT's require a sinusoidal excitation voltage. This excitation may be provided from, for example, electronic equipment that also utilizes the position information from the VDT to control an aircraft system.

Both the electronic equipment and the VDT must be protected in the case of a failure, such as a short circuit between the excitation output and the VDT. Accommodation of these failures is often accomplished by shutting off the excitation circuit. Following shutoff of the excitation circuit, redundant systems of the aircraft take over and allow for continued safe operation of the aircraft.

In prior art systems, upon detection of a failure, the output of the excitation circuit is shut off by turning off a set of electronic switches such as relays, transistors or similar components to disconnect electrical power from the excitation circuit. In this design, all of the electrical current that flows from the excitation circuit to the VDT during normal operation must also flow through the electronic components of the shutoff circuit. In the case of a short circuit fault, all the excess current generated by the short circuit must flow through the electronic components of the shutoff circuit until the failure is detected and the electronic components of the shutoff circuit are turned off. Because of this, the electronic components of the shutoff circuit must be relatively large, high-power devices that require thermal management to prevent them from failing during the short circuit condition. It is desirable to have an excitation circuit that is capable of being shut off during a failure without the need for high-power devices that require thermal management.

SUMMARY

An excitation shutoff circuit includes an operational amplifier, a transistor circuit, a switch, and a pull-down resistor. The operational amplifier receives an excitation input voltage at a non-inverting input and provides an operational amplifier output. The transistor circuit receives the operational amplifier output and provides a transistor circuit output. The transistor circuit output is connected to an inverting input of the operational amplifier. The switch is connected between the operational amplifier output and the transistor circuit. Opening the switch disconnects the operational amplifier output from the transistor circuit. The pull-down resistor is connected between an output of the switch and ground, wherein the pull-down resistor turns off the transistor circuit when the switch is opened.

DETAILED DESCRIPTION

An excitation shutoff circuit is disclosed herein that includes an operational amplifier ("op-amp") in combination with an analog switch to reduce power consumption during a fault. The analog switch is connected between the output of the op-amp and the transistor circuit. The output of the transistor circuit is connected to the inverting input of the op-amp and provides the excitation voltage to the transformer. In the event of a detected fault within, for example, the circuitry between the excitation output and a variable differential transformer (VDT), the analog switch is opened, and a pull-down resistor connected between the switch output and ground shuts off the transistor circuit which in turn shuts off excitation of the transformer. This configuration allows for low current levels through the analog switch to the transistor circuit. Because of these low current levels, the analog switch does not have to be implemented using high power, thermally managed components. This reduces the overall weight and cost of the excitation circuit.

Figure 1:
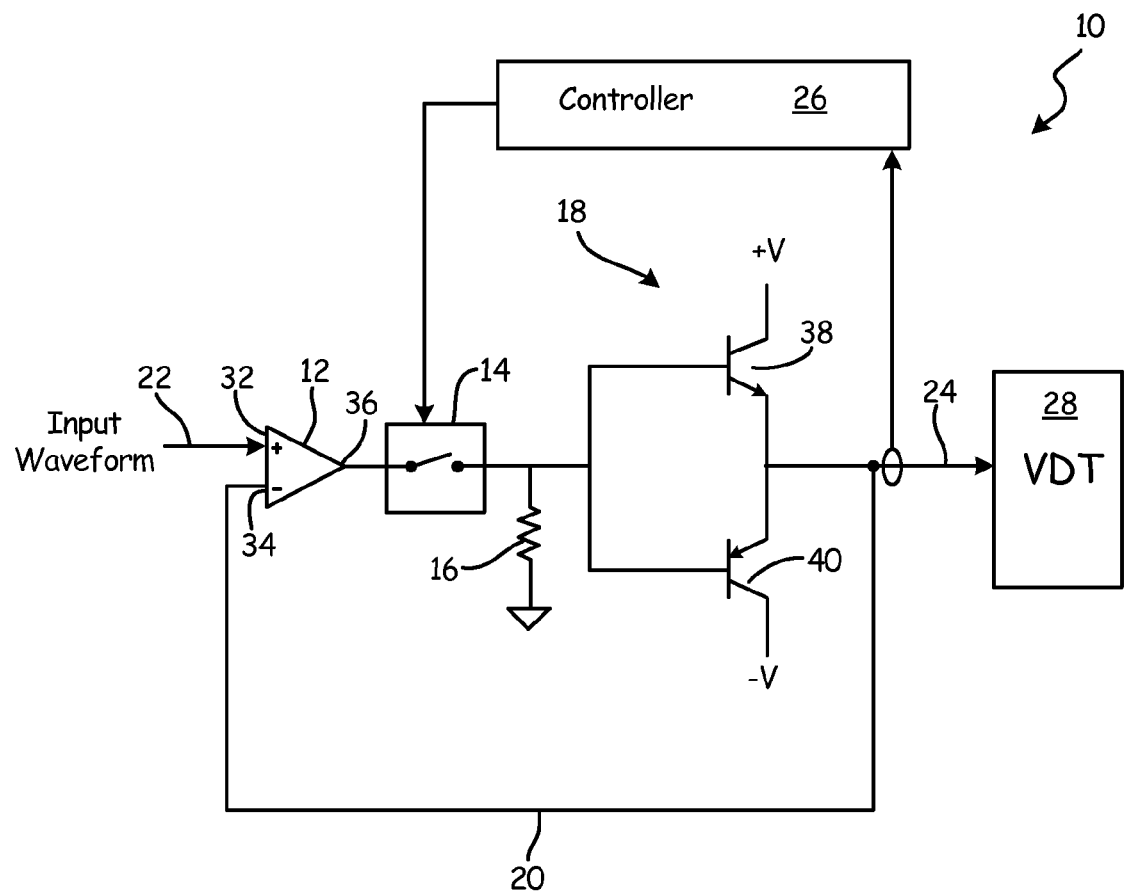
FIG. 1 is a circuit diagram illustrating a system for controlling/shutting off an excitation circuit during fault conditions.

FIG. 1 is a circuit diagram illustrating a system 10 for controlling an excitation circuit during fault conditions. System 10 includes operational amplifier 12, analog switch 14, pull-down resistor 16, transistor circuit 18, feedback line 20, input 22, output 24, controller 26 and variable differential transformer (VDT) 28. Operational amplifier 12 includes non-inverting input 32, inverting input 34, and output 36. Transistor circuit 18 includes transistors 38 and 40. Analog switch 14 is any analog switch such as, for example, a pair of metal-oxide-semiconductor field-effect transistors (MOSFET's). Input 22 receives an input voltage from any voltage source, such as an alternating current voltage source onboard an aircraft. Although illustrated as an excitation circuit for VDT 28, system 10 may be utilized to provide excitation for any circuit or device.

During normal system operation when, for example, no fault is present within system 10, analog switch 14 is closed, conducting current from output 36 to transistor circuit 18. Output 36 is provided through switch 14 to enable transistor circuit 18 which may be, for example, implemented in a push-pull amplifier configuration. Because of feedback line 20, when transistor circuit 18 is conducting current, a feedback loop is created between output 36 and inverting input 34. This implements operational amplifier 12 as a voltage follower, which causes the voltage at non-inverting input 32 to be present at inverting input 34. Because of this, the voltage provided to non-inverting input 32 is also provided to output 24, which is used to provide excitation to VDT 28.

In the embodiment shown in FIG. 1, transistor 38 is an NPN-type bipolar junction transistor (BJT) and transistor 40 is a PNP-type BJT. Transistors 38 and 40 may also be implemented as, for example, Darlington pair transistors or metal-oxide-semiconductor field-effect transistors (MOSFETs). Transistors 38 and 40 are arranged in a push-pull amplifier configuration. The bases of each transistor 38 and 40 are connected to the output of switch 14. The collector of transistor 38 is connected to a positive voltage source and the collector of transistor 40 is connected to a negative voltage source. These voltage sources are any available voltage sources such as, for example, direct current buses onboard an aircraft. The emitters of transistors 38 and 40 are each connected to output 24. A push-pull amplifier configuration such as this acts as a voltage buffer which allows low currents to be conducted from output 36 to transistor circuit 18, while higher currents are conducted at output 24 from the voltage sources. In other embodiments, transistor circuit 18 may be implemented as any other circuit that performs similar to that of the embodiment shown in FIG. 1.

Analog switch 14 is controlled by controller 26 which maybe be implemented within, for example, an electronic system onboard an aircraft, such as a helicopter. This may be the same, or different from, the system for which VDT 28 is providing position feedback. Controller 26 monitors output 24 for fault conditions using, for example, voltage sensing, current sensing, or any other method of determining a condition of output 24. The condition of output 24 may be compared by controller 26 to, for example, a reference condition to determine if a fault condition is present on output 24. Controller 26 may open analog switch 14 in response to the detected fault condition. The fault condition may be any fault, such as a short circuit between output 24 and VDT 28.

When analog switch 14 is opened, pull-down resistor 16 pulls the voltage provided to transistor circuit 18 to ground. This terminates the output of transistor circuit 18 and breaks the feedback loop between output 36 and feedback line 20. Because of the high input impedance between non-inverting input 32 and inverting input 34, input 22 is cut off from output 24, which terminates excitation of VDT 28. Pull-down resistor 16 is, for example, any resistor that does not conduct a significant amount of current during normal operation of system 10.

In prior art systems that did not include analog switch 14, two MOSFET's, for example, may have been implemented between transistor circuit 18 and each of the positive and negative power sources. During a fault, controller 26 would control the MOSFET's to terminate power to VDT 28. However, until controller 26 turns off the MOSFET's, the overcurrent present due to the fault would flow through the MOSFET's. Because of this, high power MOSFET's that may require thermal management must be utilized, which increases the overall weight and cost of the system.

By placing analog switch 14 and pull-down resistor 16 between output 36 and transistor circuit 18, analog switch 14 may be implemented using one or more low power devices. Even during overcurrent conditions, because transistor circuit 18 acts as a voltage buffer, the current levels conducted between output 36 and transistor circuit 18 remain relatively low. Because analog switch 14 does not have to be implemented as a high-power circuit that requires, for example, thermal management, the circuit may be produced with reduced weight, cost, and increased reliability over the prior art systems.

Figure 2:
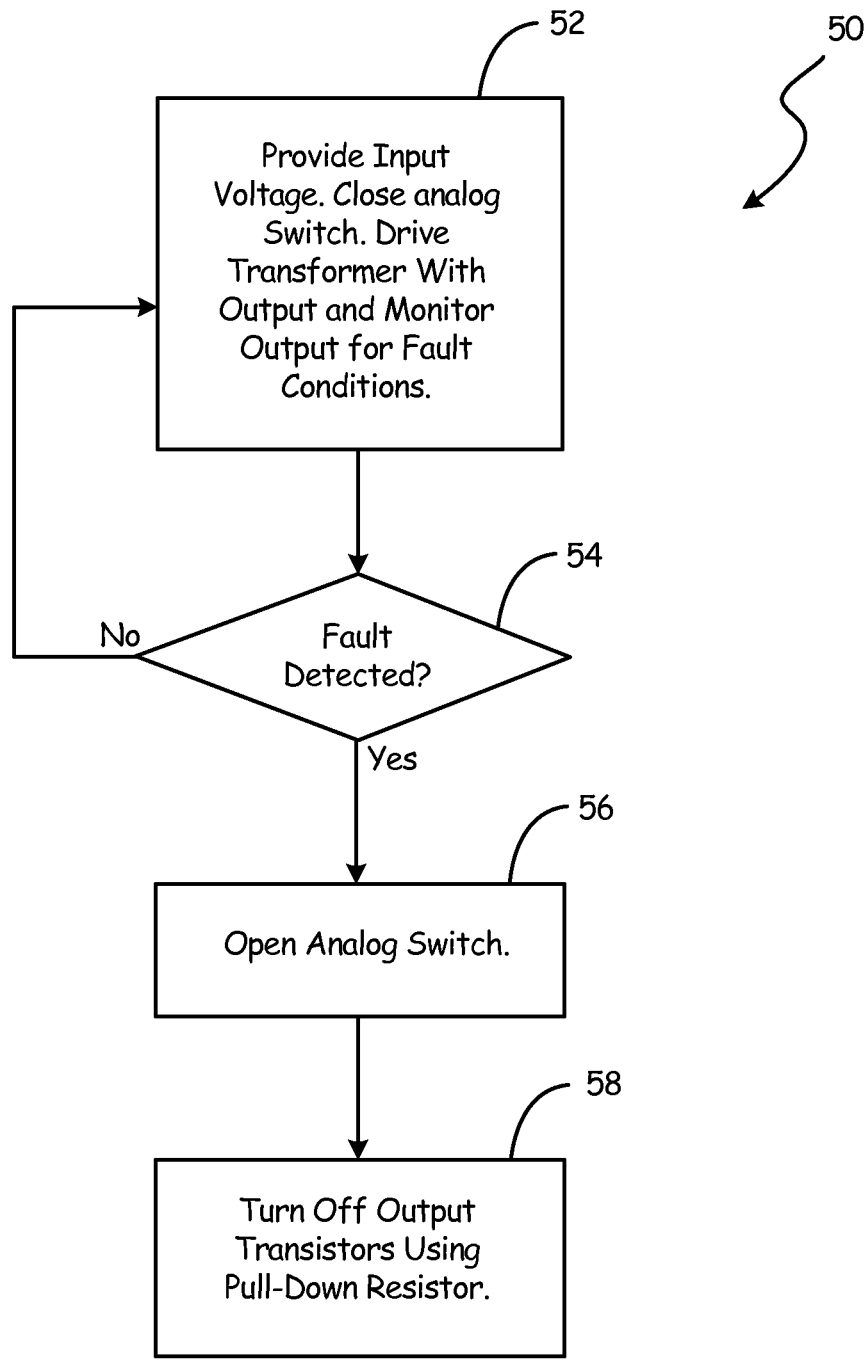
FIG. 2 is a flowchart illustrating a method for controlling an excitation circuit during fault conditions.

With continued reference to FIG. 1, FIG. 2 is a flowchart illustrating method 50 for controlling an excitation circuit during a fault. At step 52, input 22 is provided to operational amplifier 12. Analog switch 14 is closed and thus, input 22 is provided to output 24. Output 24 is monitored for faults by controller 26. At step 54, if a fault is detected, method 50 proceeds to step 56. If a fault is not detected, method 50 returns to step 52 and output 24 continues to provide excitation to VDT 28. At step 56, analog switch 14 is opened by controller 26 in response to the detected fault. At step 58, pull-down resistor 16 automatically turns off transistor circuit 18 in response to the opening of analog switch 14. This terminates the output of transistor circuit 18 which terminates excitation of VDT 18.

Discussion of Possible Embodiments

The following are non-exclusive descriptions of possible embodiments of the present invention.

An excitation shutoff circuit includes an operational amplifier, a transistor circuit, a switch, and a pull-down resistor. The operational amplifier receives an excitation input voltage at a non-inverting input and provides an operational amplifier output. The transistor circuit receives the operational amplifier output and provides a transistor circuit output. The transistor circuit output is connected to an inverting input of the operational amplifier. The switch is connected between the operational amplifier output and the transistor circuit. The switch is opened to disconnect the operational amplifier output from the transistor circuit. The pull-down resistor is connected between an output of the switch and ground, wherein the pull-down resistor turns off the transistor circuit when the analog switch is opened.

A further embodiment of the foregoing excitation shutoff circuit, wherein the transistor circuit is a push-pull amplifier comprising a first transistor and a second transistor.

A further embodiment of any of the foregoing excitation shutoff circuits, wherein the first transistor is a bipolar junction transistor comprising a first base connected to the output of the switch, a first collector connected to a first voltage, and a first emitter connected to the transistor circuit output, and wherein the second transistor is a bipolar junction transistor comprising a second base connected to the output of the switch, a second collector connected to a second voltage, and a second emitter connected to the transistor circuit output.

A further embodiment of any of the foregoing excitation shutoff circuits, wherein the excitation circuit is connected to provide excitation for a variable differential transformer.

A further embodiment of any of the foregoing excitation shutoff circuits, wherein the switch is an analog switch controlled by a controller.

A further embodiment of any of the foregoing excitation shutoff circuits, wherein the controller is configured to monitor the transistor circuit output to detect a fault, and wherein the controller opens the switch upon detection of the fault.

A further embodiment of any of the foregoing excitation shutoff circuits, wherein the controller is implemented within an electronic system of an aircraft.

A method for controlling an excitation shutoff circuit that includes, among other things, detecting a fault within the excitation circuit, wherein the excitation circuit comprises an operational amplifier, an analog switch, a pull-down resistor, and a transistor circuit, and wherein a transistor circuit output is connected to an inverting input of the operational amplifier, and the analog switch is connected between an amplifier output and the transistor circuit output; opening the analog switch in response to detection of the fault within the excitation circuit; and automatically turning off, using a pull-down resistor connected between an output of the analog switch and ground, the transistor circuit in response to opening the analog switch.

A further embodiment of the foregoing method, wherein the transistor circuit is a push-pull amplifier comprising a first transistor and a second transistor.

A further embodiment of any of the foregoing methods, wherein the first transistor is a bipolar junction transistor comprising a first base connected to the output of the switch, a first collector connected to a positive voltage, and a first emitter connected to the transistor circuit output, and wherein the second transistor is a bipolar junction transistor comprising a second base connected to the output of the switch, a second collector connected to a negative voltage, and a second emitter connected to the transistor circuit output.

A further embodiment of any of the foregoing methods, further comprising providing the transistor circuit output to a variable differential transformer.

A further embodiment of any of the foregoing methods, wherein detecting a fault within the excitation circuit comprises monitoring, using a controller, the transistor circuit output to detect an output condition; and comparing, using the controller, the output condition with a reference condition to detect the fault.

A further embodiment of any of the foregoing methods, wherein opening the analog switch comprises controlling the analog switch using the controller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An excitation shutoff circuit comprising:
    an operational amplifier configured to receive an excitation input voltage at a non-inverting input and provides an operational amplifier output;
    a transistor circuit configured to receive the operational amplifier output and to provide a transistor circuit output, wherein the transistor circuit output is connected to an inverting input of the operational amplifier;
    a switch connected between the operational amplifier output and the transistor circuit, wherein the switch is configured to disconnect the operational amplifier output from the transistor circuit by opening of the switch; and
    a pull-down resistor connected between an output of the switch and ground, so as to turn off the transistor circuit when the switch is opened.

2. The excitation shutoff circuit of claim 1, wherein the transistor circuit is a push-pull amplifier comprising a first transistor and a second transistor.

3. The excitation shutoff circuit of claim 2, wherein the first transistor is a bipolar junction transistor comprising a first base connected to the output of the switch, a first collector connected to a first voltage, and a first emitter connected to the transistor circuit output, and wherein the second transistor is a bipolar junction transistor comprising a second base connected to the output of the switch, a second collector connected to a second voltage, and a second emitter connected to the transistor circuit output.

4. The excitation shutoff circuit of claim 1, wherein the excitation circuit is connected to provide excitation for a variable differential transformer.

5. The excitation shutoff circuit of claim 1, wherein the switch is an analog switch controlled by a controller.

6. The excitation shutoff circuit of claim 5, wherein the controller is configured to monitor the transistor circuit output to detect a fault, and wherein the controller opens the switch upon detection of the fault.

7. The excitation shutoff circuit of claim 6, wherein the controller is implemented within an electronic system of an aircraft.

8. A method for controlling an excitation shutoff circuit, the method comprising:
    detecting a fault within the excitation circuit, wherein the excitation circuit comprises an operational amplifier, an analog switch, a pull-down resistor, and a transistor circuit, and wherein a transistor circuit output is connected to an inverting input of the operational amplifier, and the analog switch is connected between an amplifier output and the transistor circuit output;
    opening the analog switch in response to detection of the fault within the excitation circuit; and
    automatically turning off, using a pull-down resistor connected between an output of the analog switch and ground, the transistor circuit in response to opening the analog switch.

9. The method of claim 8, wherein the transistor circuit is a push-pull amplifier comprising a first transistor and a second transistor.

10. The method of claim 9, wherein the first transistor is a bipolar junction transistor comprising a first base connected to the output of the switch, a first collector connected to a positive voltage, and a first emitter connected to the transistor circuit output, and wherein the second transistor is a bipolar junction transistor comprising a second base connected to the output of the switch, a second collector connected to a negative voltage, and a second emitter connected to the transistor circuit output.

11. The method of claim 8, further comprising providing the transistor circuit output to a variable differential transformer.

12. The method of claim 8, wherein detecting a fault within the excitation circuit comprises:
    monitoring, using a controller, the transistor circuit output to detect an output condition; and
    comparing, using the controller, the output condition with a reference condition to detect the fault.

13. The method of claim 12, wherein opening the analog switch comprises controlling the analog switch using the controller.

* * * * *